United States Patent [19]
Atkinson et al.

[11] Patent Number: 6,001,473
[45] Date of Patent: Dec. 14, 1999

[54] STARCH ESTER RELEASE COATINGS

[75] Inventors: Jeffrey G. Atkinson, Neshanic Station; Robert L. Billmers, Stockton, both of N.J.; Susan W. Graham, Chattanooga, Tenn.; Charles J. Gzemski, Milltown, N.J.

[73] Assignee: National Starch and Chemical Investment Holding Corporation, Wilmington, Del.

[21] Appl. No.: 09/309,237

[22] Filed: May 10, 1999

Related U.S. Application Data

[62] Division of application No. 09/000,524, Dec. 30, 1997, Pat. No. 5,945,468.

[51] Int. Cl.$^6$ ....................................................... B32B 7/12
[52] U.S. Cl. ..................... 428/352; 427/208.4; 428/40.1; 428/41.8; 536/107; 536/110
[58] Field of Search .................................. 427/208.4, 208, 427/208.8; 428/352, 40.1, 41.8; 536/107, 110

[56] References Cited

U.S. PATENT DOCUMENTS

| | | | |
|---|---|---|---|
| 3,839,320 | 10/1974 | Bauer | 260/233.5 |
| 3,891,624 | 6/1975 | Boonstra et al. | 260/233.3 R |
| 4,983,701 | 1/1991 | Hara et al. | 528/15 |
| 5,321,132 | 6/1994 | Billmers et al. | 536/48 |
| 5,356,706 | 10/1994 | Shores | 428/352 |
| 5,360,845 | 11/1994 | Billmers et al. | 524/51 |
| 5,376,420 | 12/1994 | Yamamoto et al. | 428/40 |
| 5,434,201 | 7/1995 | Neigel et al. | 524/51 |
| 5,498,224 | 3/1996 | Kauffman et al. | 493/39 |
| 5,583,187 | 12/1996 | Sharaki et al. | 525/438 |

*Primary Examiner*—Daniel Zirker
*Attorney, Agent, or Firm*—Eugene Zagarella, Jr.

[57] ABSTRACT

Release coating compositions comprising:
a) a starch ester release agent having an ester component of 2 to 8 carbon atoms and a degree of substitution (DS) of from 1.0 to 2.2;
b) a hydrophobic plasticizer; and
c) water.

12 Claims, No Drawings

STARCH ESTER RELEASE COATINGS

This application is a division of application Ser. No. 09/000,524 filed Dec. 30, 1997, U.S. Pat. No. 5,945,468.

BACKGROUND OF INVENTION

This invention relates to release coatings made from selected modified starch esters and more particularly starch esters having an ester component of 2 to 8 carbon atoms and an intermediate DS of from 1.0 to 2.2.

Release coatings generally comprise compositions and/or agents that control or eliminate the adhesion between two surfaces. These coatings typically have good release characteristics, which is the capacity of permitting an adhesive material sticking to a surface to peel off easily (i.e., it must provide low interfacial tension with the adhesive mass to which it is in contact). However, good release properties are not the only characteristic desired in such materials. Other characteristics needed in release coatings include good cohesive strength, good adhesion with the backing member substrate and no contamination or component migration into the adhesive layer.

Silicone materials such as organosiloxanes are well known for their use as release agents and coatings. U.S. Pat. No. 4,983,701 issued Jan. 8, 1991, U.S. Pat. No. 5,356,706 issued Oct. 18, 1994 and U.S. Pat. No. 5,376,420 issued Dec. 27, 1994 all disclose the use of silicone materials as release agents in different applications. Other types of release agents which have been used include synthetic polymers such as polyolefins and fluorocarbons, long chain alkyl derivatives such as fatty ester synthetic waxes and fatty acids and waxes such as petroleum, vegetable and animal waxes.

While the materials exemplified above and particularly the silicone materials have been shown to have suitable release characteristics for various applications, they are not useful when repulpable, recyclable paper products are desired.

SUMMARY OF THE INVENTION

Now it has been found that release coating compositions made from selected starch esters provide good release properties as well as being biodegradable and environmentally friendly making them particularly useful in paper applications where repulpability and recyclability are desired.

More particularly, this invention relates to release coating compositions comprising:
a) a starch ester release agent having an ester component of 2 to 8 carbon atom and a degree of substitution (DS) of from 1.0 to 2.2;
b) a plasticizer; and
c) water.

This invention also involves the process of preparing a release coated substrate wherein the release coating composition as described herein is applied as a latex to a substrate and then heated to a suitable temperature causing the particles to melt and flow into a continuous film. The invention is further directed to pressure sensitive adhesive substrates comprising a substrate, a pressure sensitive adhesive layer and a release coating layer which comprises the starch ester release coating composition as described herein.

DETAILED DESCRIPTION OF THE INVENTION

The present invention provides release coating composition comprising starch ester compounds having 2 to 8 carbon atoms in the ester component and a degree of substitution of from 1.0 to 2.2. These starch esters comprise ester compounds having the formula:

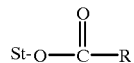

where St is the starch base material and R is an alkyl, aryl, alkenyl, alkaryl or aralkyl of 1 to 7 carbon atoms, and preferably an alkyl or alkenyl of 1 to 4 carbon atoms. More preferably, the ester compound will contain an R group which is an alkyl of 1 to 2 carbon atoms. Starch esters of this type include starch acetate, starch propionate, starch butyrate, starch hexanoate, starch benzoate, blends of two or more of these esters, for example starch acetate/starch propionate, and mixed starch esters where the starch contains two or more different ester substituants, e.g., starch acetate/propionate, i.e., the ester having the formula such as:

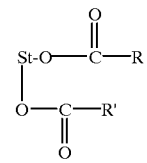

where R and R' represent different substituent groups as the R group defined above.

Additionally, the starch esters. as defined above, will have a DS (degree of substitution) of from 1.0 to 2.2, preferably from 1.2 to 1.9 and more preferably from 1.4 to 1.6. Stated differently, the starch ester will have a DS that is high enough to prevent water dispersion and is high enough to make the starch thermoplastic, i.e., having an anhydrous (without moisture or plasticizer) $T_g$ below the decomposition temperature of about 200 to 220° C. The term "degree of substitution" (DS) as used herein indicates the average number of sites per anhydroglucose unit of the starch molecule on which there are substituent groups.

The starch esters having intermediate DS as used in this invention can be prepared by reacting starch with organic acid anhydrides in a solvent system such as pyridine. An aqueous method for preparing the starch esters was recently disclosed in U.S. Pat. No. 5,321,132 issued to R. Billmers et al. on Jun. 14, 1994 and is hereby incorporated by reference. This method involves an aqueous one-step process wherein starch is reacted with high treatment levels of organic acid anhydride and high concentrations of alkaline reagents.

The base starch material used in the starch esters of this invention may be those derived from any plant source including corn, potato, wheat, rice, sago, tapioca, waxy maize, sorghum and high amylose starch, i.e., starch having at least 45% and more particularly at least 65% amylose content, such as high amylose corn. Starch flours may also be used. Also included are the conversion products derived from any of the former bases, such as dextrins prepared by hydrolytic action of acid and/or heat, fluidity or thin boiling starches prepared by enzyme conversion or mild acid hydrolysis, oxidized starches prepared by treatment with oxidants such as sodium hydpochlorite, and derivatized starches such as cationic, anionic, amphoteric, non-ionic, and crosslinked. Stated differently, the starch material may comprise a granular or dispersed starch. By dispersed or non-granular starch is meant any starch which has had its structure disrupted or removed, i.e., is destructurized by either thermal (jet cooking, boiling water bath), mechanical (drum drying, spray drying, extrusion), or chemical (use of liquid ammonia, dextrinization, subject to high levels of caustic) means prior to derivatization.

The release coating composition will contain a plasticizer and water in addition to the starch ester release agent. The plasticizer will be a non-volatile organic material which is compatible with the starch ester. The plasticizer should be non-soluble in water, i.e., less than 5% dissolved in water and is hydrophobic wherein it absorbs low levels of moisture at high humidity, i.e., have a moisture content of less than 20%, preferably less than 15% by weight at 90% relative humidity (RH) and 23° C. The plasticizer material is also liquid at ambient or room temperature and is used in sufficient amount to lower the $T_g$ (glass transition temperature) of the starch ester to the desired processing range of about 75 to 200° C., preferably 80 to 135° C. This is necessary to facilitate the melting of the coating during drying or calendering steps such as used in the papermaking process. Typically the plasticizer will have a molecular weight of less than about 10,000. A variety of plasticizer materials can be used in combination with the selected starch esters to satisfy the desired conditions. Useful plasticizer materials include those containing polar groups such as sulfonamides, carboxylic acids and esters, carboxylate salts, amides, phosphate esters, alcohols i.e., hydroxy containing compounds, epoxides, sulfones, ethers, imides, amines, carbonates, ureas and urethanes. Preferred plasticizers are those containing sulfonamide, alcohol, amide and ester groups which absorb low levels of moisture at high humidity, i.e., have a moisture content of less than about 20%, preferably less than about 15% by weight, at 90% relative humidity and 23° C. The preferred plasticizers do not include the hydrophilic type compounds such as glycerin or sorbitol and other compounds of this type which are hygroscopic and easily pick up and absorb moisture. Useful plasticizers include low molecular weight polyesters such as polyethylene glycol and dicarboxylic acids, e.g., adipic acid/succinic acid, poly(hydroxybutyrate-co-valerate), polcaprolactone, alkoxylates of phenols and phenolic derivatives such as ethoxylates of phenol and bisphenol A, and fatty acid amides. The preferred plasticizers are the polyesters of polyethylene glycol and adipic acid or succinic acid, and the ethoxylate of bisphenol A.

The release coating composition will generally comprise from about 10 to 50% by weight of starch ester, about 0 to 30% by weight of plasticizer and about 20 to 90% by weight water. Preferably the composition will comprise from about 15 to 35% by weight of starch ester, from about 5 to 25% by weight of plasticizer and about 35 to 80% by weight of water. Other components which are conventionally used depending on the application may also be added to the composition including, for example, fillers, antioxidants, stabilizers, surfactants, waxes and dyes or colorants.

The starch ester of this invention is hydrophobic and not water soluble and cannot be dissolved or dispersed in water even at elevated temperatures, e.g., room temperature to 150° C., and therefore cannot be applied or coated as an aqueous solution. Therefore, the starch ester composition is formed into a latex having discrete particles of starch and plasticizer suspended in water. The latex is applied or coated onto the desired substrate and then dried to give a non-continuous film. Heating to a temperature of about the $T_g$ of the starch ester or higher, typically about 100 to 200° C., causes the particles to melt and flow, forming a continuous film on the substrate. Because water does not dissolve the polymer and is not responsible for film formation, heating above the $T_g$ of the starch ester can be done during the drying step and/or anytime after the water is evaporated. The coating can be dried by air drying or using an oven, dryer can or other conventional drying means. The coating can be heated to form a continuous film by techniques such as calendering or thermal processing.

Any conventional coating technique can be used to apply the release coating composition to the substrate such as brushing, spreading, dipping, rolling, wire or knife coating. The technique is selected depending on the substrate to be coated. The composition can be applied to the substrate at room temperature or above, preferably about 50 to 75° C., to reduce the viscosity of the formulation and facilitate removal of water. The mixture can also be prepared at ambient temperature or above. Heating the components during formulation helps absorb the plasticizer into the starch particles thereby providing a more uniform latex.

The release coating composition can be applied to any substrate and is particularly useful for paper products such as those containing pressure sensitive adhesives. These starch ester release coatings used on paper products provide good release characteristics and because of their biodegradability and other environmental properties allow such products to be repulped and recycled.

The following examples will further illustrate the embodiments of this invention. In these examples all parts are given by weight and all temperatures in degrees Celsius unless otherwise noted.

EXAMPLE I

A release coating composition containing the starch esters of this invention was prepared as follows.

Into a 250 ml Erlenmeyer flask, 16.5 g of anhydrous granular starch acetate (70% amylose corn starch with acetate DS=1.3), 5.0 g ethoyxiated bis-phenol A (Macol 206-EM, PPG Industries) and tap water were added to bring the total weight to 50.0 g. Using a stainless steel mixing spoon, the contents of the Erlenmeyer were mixed vigorously until the mixture formed a paste. A lead weight was placed around the opening of the flask and the flask placed in a boiling water bath so that the water level was above the material contents. The flask was heated for one hour with occasional stirring and then removed from the boiling water bath and mixed well. Water was added to bring the weight up to the starting tare weight The mixture was placed back in the boiling water bath until ready for application as shown below.

EXAMPLE II

A sheet of paper label base stock (9"×11") (bases weight; 43#, 270 sec. high pressure Gurley) was placed on a large glass plate and the top edge of the paper taped to the glass plate. The glass plate was laid on a flat horizontal surface and a #9 wire round placed at the top of the paper substrate. The coating material prepared in Example I was removed from the boiling water bath and a ½ inch bead applied across the top of the paper substrate (just below the wire round). The ends of the wire round were grasped and drawn down past the end of the paper substrate while applying light pressure. The paper with coating was removed from the glass plate and placed on a drying ring with the coated side facing down. The center disk was placed onto the drying ring and a weight placed thereon and the coating was allowed to air dry.

The dried paper substrate was removed from the drying ring. The coated substrate was calendered using a heated stainless steel roller with the coated side facing the heated roller. The conditions were 5000 psi (pressure between the rolls), 90° C. (temperature of upper SS roll) and 2 nips (sheet passed through two times).

The coated label base stock was evaluated for release and retained adhesive properties as follows:

1. An 8 inch section of Scotch Magic tape #810 was laminated to the coated paper.

2. Assure good contact is made between the tape and the release composition.

3. Allow tape to remain on the release surface for three weeks at room temperature.

4. Using an Instron tester, the force required to peel the tape from the release surface was measured (at 180 degrees with test speed of 10.0 in/min).

5. Remove second piece of tape from release surface by hand.

6. Apply the tape in #5 to a clear, smooth stainless steel panel (Chem Instruments, cat. #TP-39). The sample is rolled down, two passes with a 2-kilogram rubber-covered roller (Chem Instruments, cat #WR-100) and allowed to dwell 20 minutes prior to testing.

7. The peel strength was measured as in #4.

8. The release value was reported as peel strength measured in #7 (grams/0.75 inch).

9. A new piece of tape (without contact of release paper) was applied to the stainless steel panel as in #6 and removed and measured as in #4.

10. The percent retained adhesion=adhesion from #7 above X 100/adhesion from #9 above.

Table 1 below shows the measured physical properties of the coated label base stock using the starch ester of this invention and compared to a commercial silicone release paper. This example shows similar release energies of the starch based coating while maintaining excellent adhesion properties.

TABLE 1

| Sample | Release (g/in) | % Retained Adhesion |
|---|---|---|
| Starch acetate (DS = 1.3) | 255 | 98 |
| Rhinelander Tight Release (Silicone, #402–8437) | 52 | 88 |
| Base (uncoated) | fiber tear | — |

EXAMPLE III

A release coating composition was prepared as in Example I using 30 g of anhydrous granular starch (70% amylose corn starch with acetate DS=1.3), 10.0 g of succinate polyester (Resoflex R-804, Cambridge Industries of America) and tap water to total 133.3 g. The coating composition was coated onto a label base stock as in Example II and various physical properties measured and compared to two grades of commercial silicone release paper as shown below in Table 2. This example shows the formation of a smooth continuous coating similar in properties to silicone coated paper.

TABLE 2

| Sample | Porosity - High Pressure Gurley Gurley (sec) | Parker Print | Hercules Size Test |
|---|---|---|---|
| Base (uncoated) | 800 | 5.10 | 27 |
| Starch Acetate (DS = 1.3) on Basestock | 4950 | 3.7 | 185 |
| Rhinelander Premium Release (Silicone, #442–8354) | 2670 | 3.86 | 960 |
| Rhinelander Tight Release (Silicone, #402–8437) | 3152 | 3.86 | 2580 |

EXAMPLE IV

An acid degraded waxy starch was predispersed and then acetylated to a DS of 1.0. The acetylated product was purified by decanting the aqueous media and triturating with distilled water. The coating formulation was prepared as illustrated in Example I. Other similar coatings were made using different starch esters, either waxy corn or high amylose corn (70% amylose) based, and either dispersed or granular. The prepared compositions were coated onto a paper label basestock as in Example II and tested for various physical properties with the results given below in Table 3. The results show that the starch ester can be used in either granular or dispersed form and processed at different temperatures with satisfactory coating results. All samples had porosities of greater than 100,000 high pressure Gurley seconds.

TABLE 3

| Sample No. | Starch Structure | Starch Type | % Plasticizer | Formulation Temp (° C.) | Parker Print | Release Energy (g/in) |
|---|---|---|---|---|---|---|
| 1 | dispersed | waxy | 25 | RT | 2.3 | 572 |
| 2 | dispersed | waxy | 25 | 65 | 2.5 | 561 |
| 3 | granular | waxy | 25 | RT | 3.9 | 295 |
| 4 | granular | waxy | 25 | 65 | 3.3 | 289 |
| 5 | granular | High Amylose | 25 | RT | 3.1 | 255 |
| 6 | granular | High Amylose | 25 | 65 | 2.2 | 230 |
| 7 | dispersed | Waxy | 50 | 65 | 2.9 | 225 |

What is claimed is:

1. A process for preparing a release coated substrate comprising:

a) providing a release coating composition comprising a latex of discrete particles of starch and plasticizer suspended in water wherein:
  i) the starch is a starch ester release agent having an ester component of 2 to 8 carbon atoms and a degree of substitution (DS) of from 1.0 to 2.2; and
  ii) the plasticizer is a non-volatile, polar organic material that is compatible with the starch ester and is present in sufficient amount to lower the $T_g$ of the starch ester to a temperature of about 75 to 200° C.;
 b) applying the release coating composition to a substrate; and
 c) heating the coated substrate to a temperature at or above the $T_g$ of the starch ester to melt the particles and form a continuous film.

2. The process of claim 1 wherein the coated substrate is dried prior to heating.

3. The process of claim 1 wherein the starch ester in the release coating composition has the formula:

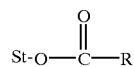

where St is the starch base material and R is an alkyl, aryl, alkenyl, alkaryl or aralkyl of 1 to 7 carbon atoms.

4. The process of claim 3 wherein the starch ester has a DS of from 1.2 to 1.9.

5. The process of claim 3 wherein the starch ester has 2 to 5 carbon atoms in the ester component.

6. The process of claim 5 wherein the starch ester has a DS of from 1.2 to 1.9 and the coated substrate is dried prior to heating.

7. The process of claim 6 wherein the substrate is paper.

8. A pressure sensitive adhesive structure comprising a substrate layer, a pressure sensitive adhesive layer and a release coating layer wherein the release coating comprises a latex of discrete particles of starch and plasticizer suspended in water wherein:
   i) the starch is a starch ester release agent having an ester component of 2 to 8 carbon atoms and a degree of substitution (DS) of from 1.0 to 2.2; and
   ii) the plasticizer is a non-volatile polar organic material that is compatible with the starch ester and is present in sufficient amount to lower the $T_g$ of the starch ester to a temperature of about 75 to 200° C.

9. The pressure sensitive adhesive structure of claim 7 wherein the substrate layer is paper and the starch ester has a DS of from 1.2 to 1.9.

10. The pressure sensitive adhesive structure of claim 9 wherein the starch ester has 2 to 5 carbon atoms in the ester component.

11. The pressure sensitive adhesive structure of claim 9 wherein the starch ester in the release coating has the formula:

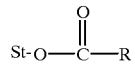

where St is the starch base material and R is an alkyl, aryl, alkenyl, alkaryl or aralkyl of 1 to 7 carbon atoms.

12. The pressure sensitive adhesive structure of claim 11 wherein the substrate is paper and the starch ester has a DS of 1.2 to 1.9.

* * * * *